US008649800B2

(12) United States Patent
Kalliola et al.

(10) Patent No.: US 8,649,800 B2
(45) Date of Patent: Feb. 11, 2014

(54) DIRECTION-ENHANCED NAVIGATION

(75) Inventors: Kimmo Heikki Juhana Kalliola, Helsinki (FI); Lauri Wirola, Tampere (FI); Karl Townsend, Los Altos, CA (US)

(73) Assignee: Nokia Corporation, Espoo (FI)

( * ) Notice: Subject to any disclaimer, the term of this patent is extended or adjusted under 35 U.S.C. 154(b) by 389 days.

(21) Appl. No.: 13/106,607

(22) Filed: May 12, 2011

(65) Prior Publication Data

US 2012/0289241 A1 Nov. 15, 2012

(51) Int. Cl.
*H04W 24/00* (2009.01)

(52) U.S. Cl.
USPC ...................................... 455/456.1

(58) Field of Classification Search
USPC ............. 455/456.1, 440, 456.2, 456.3, 414.3, 455/518, 41.2, 519, 414.2, 456.5; 701/207, 701/213; 705/26, 0.1, 14; 707/10, 9, 30
See application file for complete search history.

(56) References Cited

U.S. PATENT DOCUMENTS

| 7,667,646 | B2 | 2/2010 | Kalliola et al. | |
| 8,417,258 | B2 * | 4/2013 | Barnes, Jr. ................. | 455/456.1 |
| 2008/0311957 | A1 | 12/2008 | Jantunen et al. | |
| 2010/0259450 | A1 | 10/2010 | Kainulainen et al. | |

FOREIGN PATENT DOCUMENTS

| EP | 1786143 | 5/2007 |
| JP | 5297098 | 11/1993 |
| WO | WO2007145890 | 12/2007 |
| WO | WO2010040392 | 4/2010 |

OTHER PUBLICATIONS

English language machine translation of Japanese Patent Publication No. JP5297098—12 pages.
English language abstract corresponding to abstract of Japanese Patent Publication No. JP5297098—1 page.
Sayed, A. et al., "Network-Based Wireless Location", IEEE Signal Processing Magazine, Jul. 2005, pp. 24-40.
International Search Report for International Application No. PCT/FI2012/050386—Date of Completion of Search: Aug. 17, 2012, 4 pages.
Written Opinion of the International Searching Authority for International Application No. PCT/FI2012/050386—Date of Completion of Opinion—Aug. 17, 2012, 8 pages.
International Search Report for International Application No. PCT/IB2012/052780—Date of Completion of Search: Sep. 27, 2012, 6 pages.

(Continued)

*Primary Examiner* — Melody Mehrpour
(74) *Attorney, Agent, or Firm* — Locke Lord LLP

(57) ABSTRACT

A system for providing positioning functionality in an apparatus without having to implement dedicated hardware. An apparatus that desires to receive directional information may receive a message from another apparatus (e.g., access point or AP). The AP may operate in various modes that, for example, may provide directional information to other apparatuses as part of a general broadcast (e.g., a wireless local area network, or WLAN, beacon signal) or in response to messages requesting directional information that are received from other apparatuses. After receiving the message from the AP, the apparatus may determine if the message comprises directional information. If the message is determined to comprise directional information, directional information from the received message may be utilized to determine apparatus location. Otherwise, the apparatus may then send a message requesting directional information to the AP, which may prompt the AP to provide directional information.

25 Claims, 13 Drawing Sheets

(56) References Cited

OTHER PUBLICATIONS

Written Opinion of the International Searching Authority for International Application No. PCT/IB2012/052780—Date of Completion of Opinion: Sep. 27, 2012, 8 pages.

Abdat, M., et al., "Survey on Indoor Wireless Positioning Techniques: Towards Adaptive Systems", 2010 International Conference on Distributed Framework for Multimedia Applications (DFmA), 5 pages.

Kemppi, P., et al., "Hybrid positioning system combining angle-based localization, pedestrian dead reckoning and map filtering", 2010 International Conference on Indoor Positioning and Indoor Navigation (IPIN), Sep. 15-17, 2010, Zurich, Switzerland, 7 pages.

Papapostolou, A., et al., "Exploiting Multi-modality and Diversity for Localization Enhancement: WiFi & RFID usecase", EPOQUENET NPL XP031659657, Sep. 13-16, 2009, Tokyo, Japan, pp. 1903-1907.

ETSI TS 136.305 V9.6.0 (Apr. 2011) Technical Specification; LTE; Evolved Universal Terrestrial Radio Access Network (E-UTRAN) Stage 2 functional specification of User Equipment (UE) positioning in E-UTRAN (3GPP TS 36.305 version 9.6.0 Release 9).

\* cited by examiner

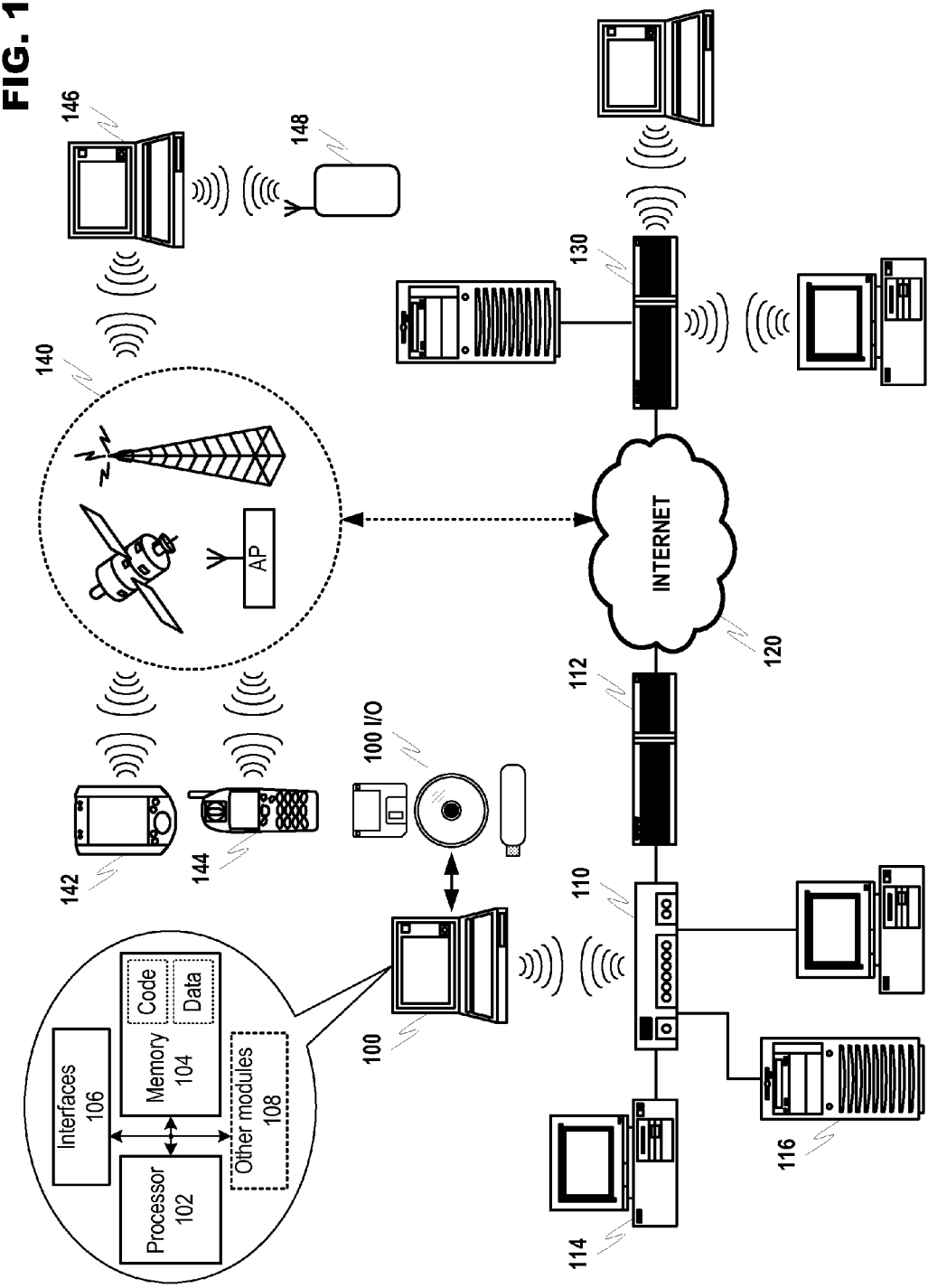

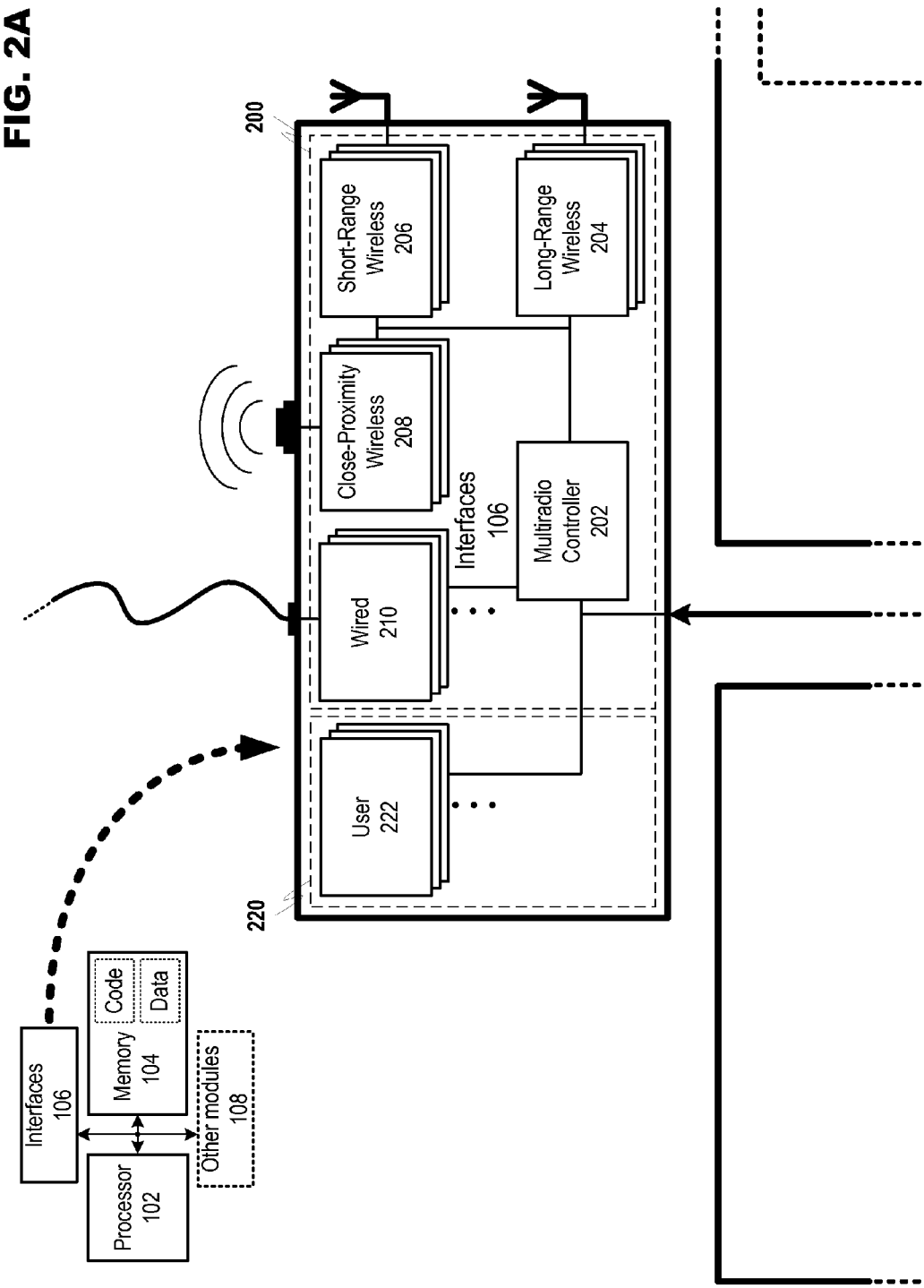

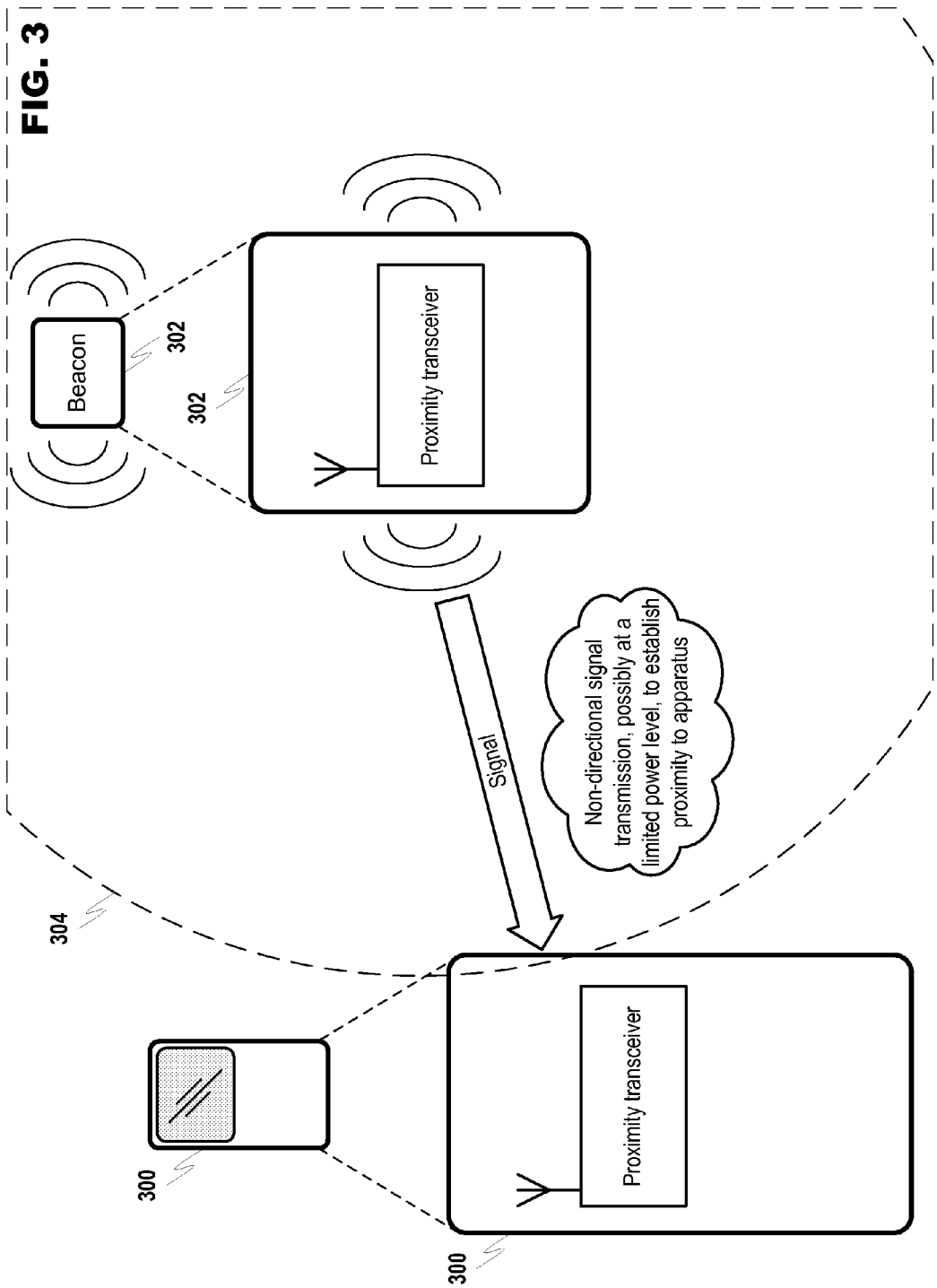

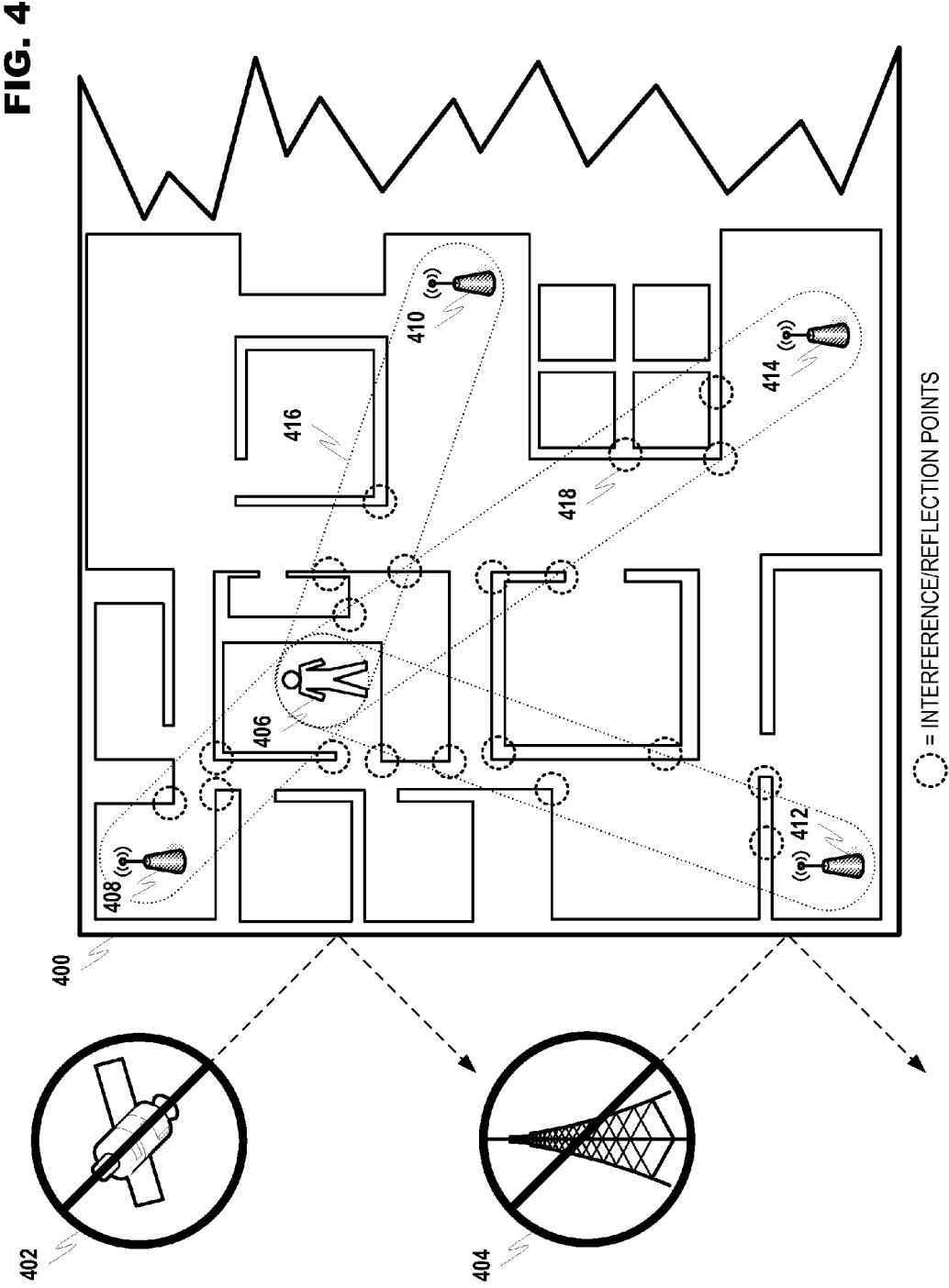

DIRECTION-ENHANCED NAVIGATION

BACKGROUND

1. Field of Invention

The present invention relates to electronic positioning, and in particular, to determining apparatus position/location based on information received from other apparatuses.

2. Background

Wireless-enabled apparatuses have evolved past just being able to provide voice communication to a point where they may provide various functionality. For example, mobile wireless devices have become flexible computing platforms on which various applications may be implemented. In addition to the more straightforward communication applications such as voice, email, text messaging, etc., emerging apparatuses may be able to support various games, productivity applications, business applications, database access applications, etc. In addition, wireless-enabled apparatuses may be able to support apparatus location/positioning services.

In the case of apparatus location/positioning services, current implementations may rely upon combinations of specialized hardware and/or software resources in determining apparatus position. For example, dedicated hardware receivers may scan for global positioning system (GPS) signals that may be utilized to accurately determine apparatus location/position in terms of longitude/latitude. This information may be utilized by applications in the apparatus in order to display current user location on a map, to display points of interest around the current user location, to formulate a route from the current user location to a point of interest, etc.

The above location/position system performs well in certain situations, such as when high-end apparatuses are operating outside where they may take advantage of clear GPS signal reception and well-established map data. However, dedicated GPS receivers may occupy crucial space in already crowded apparatuses, and may place substantial burden on apparatus resources like power, processing capacity, etc. As a result, smaller apparatuses that wirelessly interact at a very basic level may not be able to support position/location services. Moreover, GPS positioning is not a viable solution for indoor location/position determination where interference caused by various structures and signal sources may make the signals unreliable.

SUMMARY

Example embodiments of the present invention may be directed to a method, computer program product, apparatus and system for providing positioning functionality in an apparatus without having to implement dedicated hardware. An apparatus that desires to receive directional information may receive a message from another apparatus (e.g., access point or AP). The AP may operate in various modes that, for example, may provide directional information to other apparatuses as part of a general broadcast (e.g., a wireless local area network, or WLAN, beacon signal) or in response to messages requesting directional information that are received from other apparatuses. After receiving the message from the AP, the apparatus may determine if the message comprises directional information. If the message is determined to comprise directional information, directional information from the received message may be utilized to determine apparatus location. Otherwise, the apparatus may then send a message requesting directional information to the AP, which may prompt the AP to provide directional information.

The directional information that is provided to the apparatus from the AP may be, for example, Angle of Arrival (AoA) information or Angle of Departure (AoD) information. In instances where the apparatus transmits a message requesting directional information to the AP, a second message comprising directional information may be received in the apparatus from the AP. The apparatus may then use the directional information to determine apparatus location.

As disclosed above, the apparatus providing directional information (e.g., AP) may operate in various modes. For example, the AP may determine whether it is operating in a broadcast mode or a scan first mode. If determined to be operating in a broadcast mode, the AP may formulate directional information for other apparatuses based on signals received from the other apparatuses, may associate the directional information for each of the other apparatuses with corresponding apparatus identification information and may transmit a message comprising the directional and identification information (e.g., in a WLAN beacon signal). Otherwise, if it is determined that the AP is operating in a scan first mode, the AP may again formulate directional information for other apparatuses based on signals received from the other apparatuses. The AP may then receive requests from at least one of the other apparatuses for directional information and may then transmit a message comprising the directional information corresponding to the at least one other apparatus. It may be further possible, in accordance with at least one embodiment of the present invention, that if the AP determined not to be operating in a broadcast or first scan mode, for the AP to receive a message requesting directional information from at least one of the other apparatuses, to formulate directional information corresponding to the at least one of the other apparatuses, and to then transmit a message comprising the directional information corresponding to the at least one of the other apparatuses.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1 discloses example apparatuses, communication configuration and network architecture usable in implementing at least one embodiment of the present invention.

FIG. 2A discloses additional detail with respect to example communication interfaces usable with at least one embodiment of the present invention.

FIG. 3 discloses an example of positioning based on proximity information in accordance with at least one embodiment of the present invention.

FIG. 4 discloses an example operating scenario in accordance with at least one embodiment of the present invention.

DESCRIPTION OF EXAMPLE EMBODIMENTS

Figure 2B:
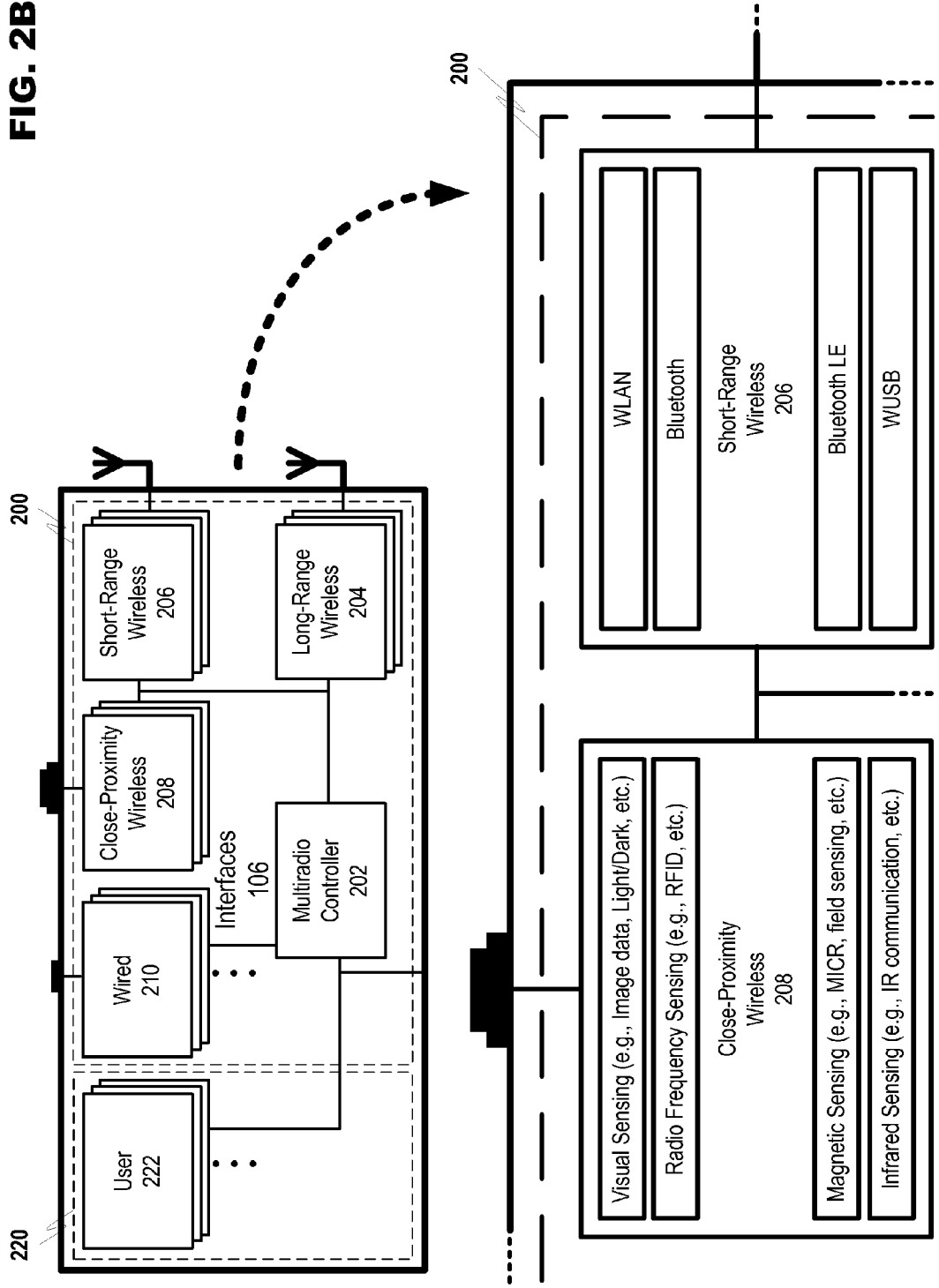
FIG. 2B discloses additional detail with respect to example close proximity and short range wireless resources usable with at least one embodiment of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106, shown with respect to computing device 100 in FIG. 1, is now discussed with respect to FIG. 2A. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2A have been presented only for the sake of explanation herein, and thus, are not intended to limit the various embodiments of the present invention to utilization of any particular interface. Embodiments of the present invention may also utilize interfaces that are not specifically identified in FIG. 2A.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2A.

The example communication interface configuration 106 disclosed in FIG. 2A may, in accordance with at least one embodiment of the present invention, further comprise example close-proximity wireless interfaces 208 such as set forth in FIG. 2B. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth communication, Bluetooth Low Energy communication, wireless Universal Serial Bus (WUSB) communication, etc. These forms of communication may, in various applications, support wireless interaction between two or more handheld wireless communication devices, between a handheld wireless communication device and a stationary access point (AP), to peripheral interface devices, etc.

II. Example Operational Environment

Assisted global positioning (A-GPS) and other electronic positioning solutions based on wireless communication may perform acceptably and may provide extensive coverage in outdoor operational environment where signal quality and number of satellites/base stations are typically very good. This performance may be bolstered by accurate maps featuring terrain features, roads, traffic conditions and other related information have been mapped exhaustively and are constantly maintained from satellite images, aerial photography, feedback from user communities, etc. Together, the available positioning solutions and the feature-rich maps may provide excellent user experiences (e.g., such as in instances including vehicle and pedestrian navigation use).

The situation becomes totally different for indoor operational environments. Known positioning technologies have very limited capabilities indoors, and thus, usually fail. There are many reasons for these failures. Initially, existing positioning/mapping solutions may be expensive and difficult to implement. Map information does not exist for many public/private structures, and the provision of this information requires extensive modeling visualization and/or mapping that is currently only provided by private companies. Further, existing solutions may provide unstable and/or unpredictable performance, which may occur to do external positioning signals being unavailable or unreliable and indoor signals lacking sufficient position resolution.

An example of a proximity-based positioning system usable in indoor operational environments is disclosed in FIG. 3. One or both of apparatus 300 and beacon 302 may include proximity transceivers that may send or receive wireless signals usable for measuring apparatus proximity. For example, beacon 302 may periodically transmit signals receivable by apparatus 300. Upon receiving a signal transmitted from beacon 302, apparatus 300 may at least know that it is within transmission range of beacon 302. However, this is a very rudimentary operation in that the precise position of apparatus 300 may only be narrowed to the broadcast radius of the beacon 302. The signal strength 304 of beacon 302 may be limited so that it only covers a small area, which may increase positioning resolution. However, such a change may be prohibitive as it would necessitate many more beacons 302 in order to cover the full operational environment.

The location estimation for apparatus 300 may be refined by introducing received signal strength (RSS) sensing for signals received from beacon 302. For example, beacon 302 (e.g., an AP in a WLAN network) may transmit signals including AP identification information that can be measured by apparatus 300 (e.g., a mobile device), and based on the RSS measured from several APs 302, mobile device 300 may estimate its location relative to the measured AP locations. A global location reference (e.g., the location of apparatus 300 within the operational environment occupied by one or more apparatuses 302) may then be computed based on operational environment information available from a database mapping the location of each AP 302 within the space. More specifically, after apparatus 300 defines its position with respect to one or more apparatuses 302, and defines the position of apparatuses 302 within the operational environment, apparatus 300 may then extrapolate its position in the operational environment.

However, positioning based on RSS measured at apparatus 300 may suffer from substantial variance in measured RSS values caused by obstacles on the radio propagation path. An example of a problematic situation is providing electronic positioning within a structure such as a building. While positioning within a building will be utilized for the sake of explanation herein, the various embodiments of the present invention are not limited only to implementation in this specific application. Almost any situation wherein traditional positioning techniques do not provide adequate performance (e.g., speed, resolution, etc.) may experience improvement through the following example embodiments and/or implementations of the present invention.

Partial floor plan 400 disclosed in FIG. 4 will help to explain various challenges to traditional electronic positioning that may be experienced within a structure (e.g., building). Information received from satellites 402 may be effective when outside where these signals may be efficiently received. However, structures may present physical obstacles that significantly reflect, or totally block, such signals as shown in FIG. 4. Signals from long-range earth-based networks 404 (e.g., cellular) are receivable inside structures and may be used for communication purposes, but may prove unreliable for use in positioning due to similar sources of interference in a structure (e.g., building) coupled with long distances between the user apparatus and the base station. User 406 may then have to rely on wireless electronic communication provided within a building in order to electronically determine position. For example, APs 408, 410, 412 and 414 may support wireless communication within floor plan 400. In addition to simply providing data communication (e.g., access to LAN or WAN such as the Internet), the signals transmitted from the APs may also be used for positioning. Various methodologies for estimating position may be employed, each with differing amounts of accuracy. For example, connection 416 to a particular AP (e.g., AP 410) indicates that user 406 is within communication range of that AP. However, the resolution provided by such estimation is inexact, especially within the confines of buildings.

Moreover, signals 416 transmitted by AP 408-414 may experience substantial interference and/or reflection from various physical elements 418 within a building or structure. For example, walls containing wiring or metallic conduits, hallways containing various corners and other possibly intrusive objects, metal in elevator shafts, etc. may cause signal interference or reflection 418. Interference/reflection points 418 may result in AP signals 416 being delayed significantly, or not being received at all. Further, these signals may be received from directions that do not indicate the actual direction from which the signal was originally sent, and thus, may cause inaccuracy when employing these traditional position finding techniques.

Fingerprinting is one technique can be used to overcome in-structure positioning problems such as described above. Fingerprinting includes pre-measuring various characteristics (e.g., RSS values for signals transmitted from each AP) at different locations in the operational environment to create location "fingerprints," and storing the fingerprints in a database where they may be used as location references. However, the fingerprinting method does not remove uncertainty caused by unknown effects, such as people moving in the surroundings, user body and/or device orientation, device dependent antenna properties, etc., which all may significantly affect sensed signal strength. One method of mitigating this effect is to create a time-dependent fingerprint database, (e.g., by taking multiple reference measurements at different times of day) and then using data-mining/clustering techniques to find the match. However, these methods are costly, laborious and consume many resources (e.g., processing power, data storage space, etc.).

Another problem is that at distances further away from an AP the signal strength changes very little as function of distance. For the reasons mentioned above, location accuracy in the range of 3-30 meters can be practically achieved based only on RSS measurements, but the highest precision can only be obtained by calibrating out all user effects and devices effects (e.g., by using similar devices with unified and known antenna properties). Direction-finding antennas in WLAN APs have been proposed to improve the location accuracy. By using direction-finding antennas location accuracy can be improved to less than one meter even without fingerprinting. An example indoor positioning system may be based on ceiling mounted directional positioning beacons and mobile devices may resolve location based on receiving specific positioning packets from the beacons.

III. Example Directional Information

Figure 5:
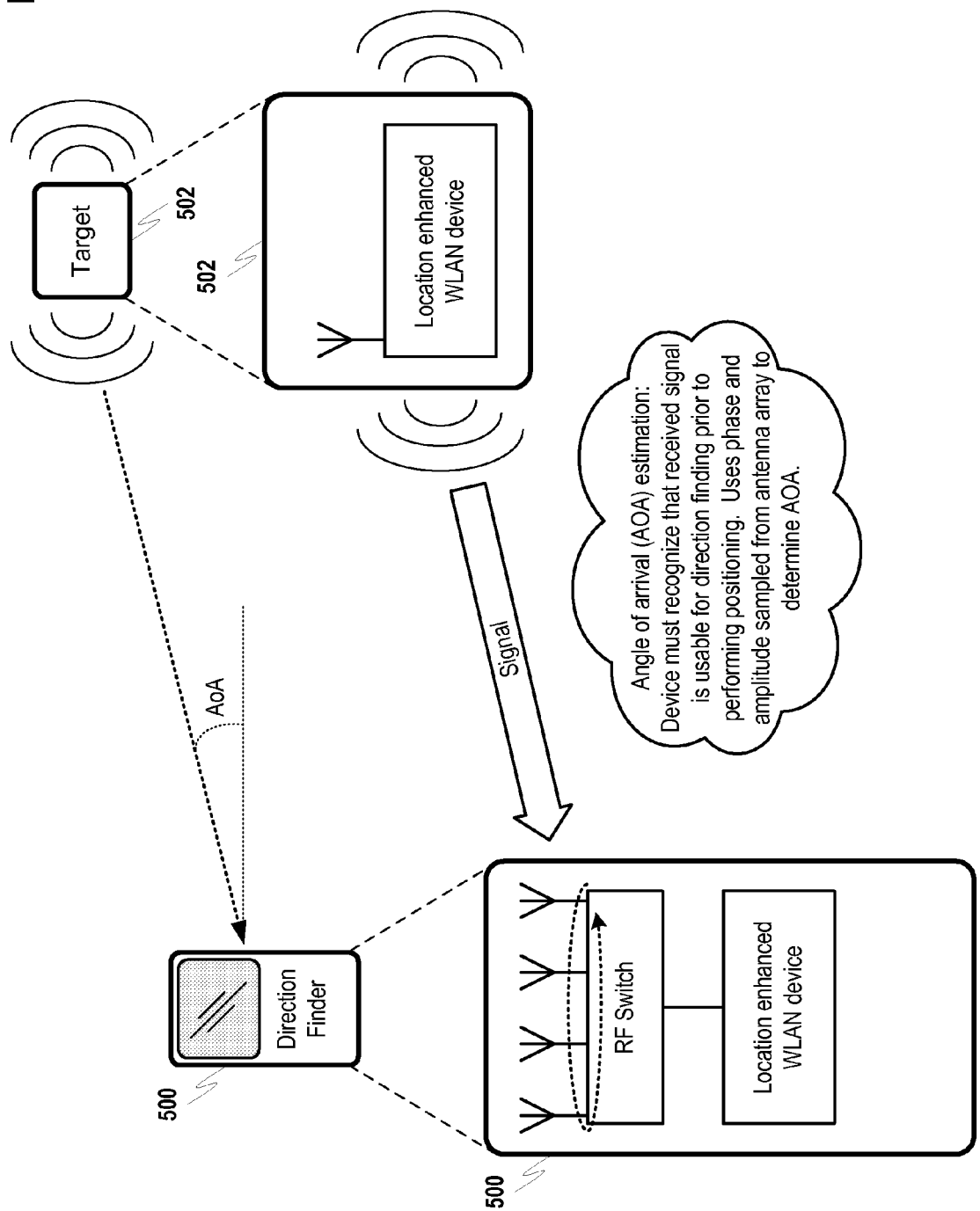
FIG. 5 discloses an example of positioning based on Angle of Arrival (AoA) information in accordance with at least one embodiment of the present invention.
Figure 6:
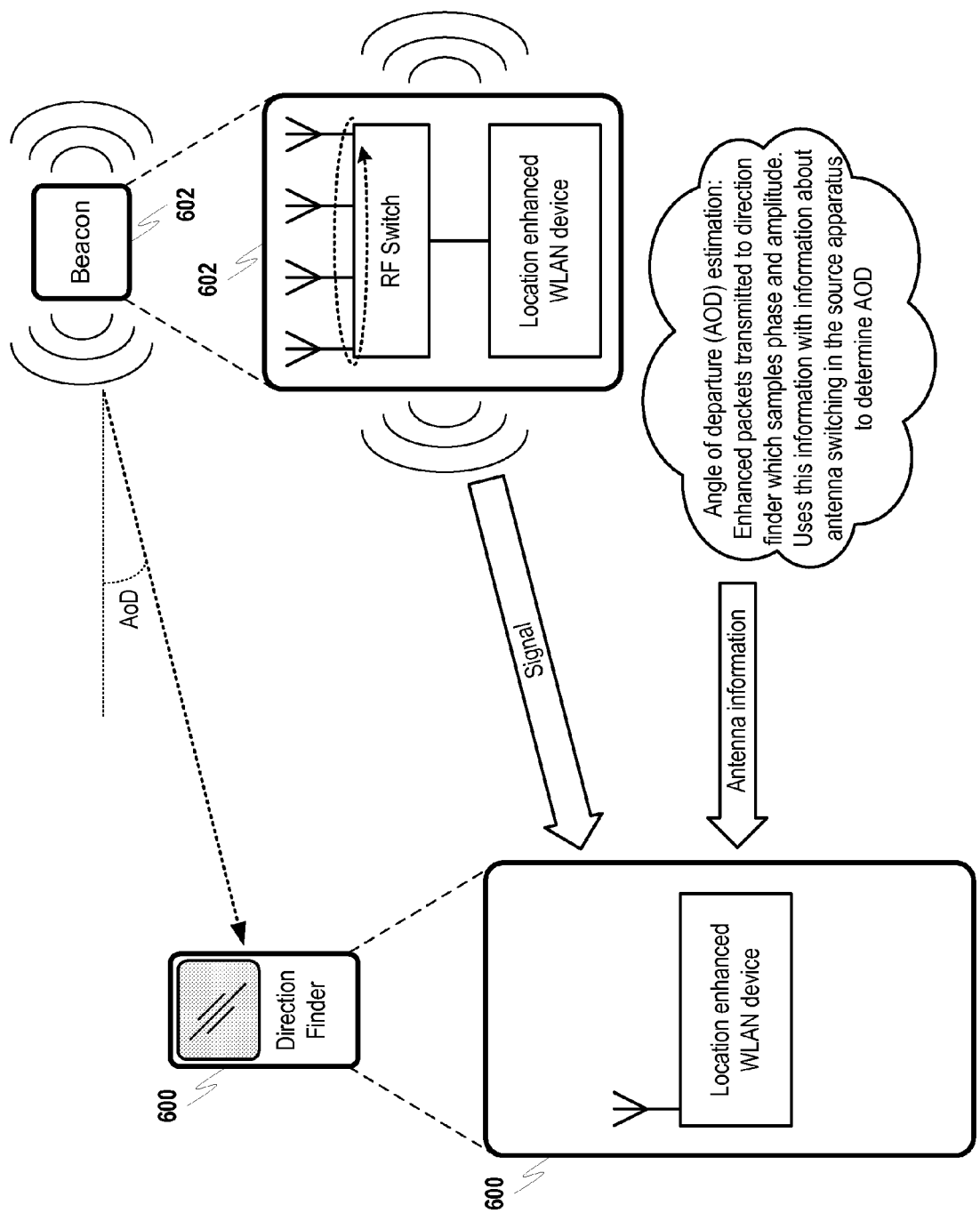
FIG. 6 discloses an example of positioning based on Angle of Departure (AoD) information in accordance with at least one embodiment of the present invention.

FIGS. 5 and 6 disclose two examples of electronic direction-finding that may be implemented in apparatuses. For the sake of explanation in these figures, it is assumed that the disclosed apparatuses may communicate using WLAN. While various embodiments of the present invention will be described as using WLAN, the use of this communication medium is not intended to limit the present invention. On the contrary, it is conceivable that the various embodiments of the present invention may be implemented using alternative wireless mediums.

FIG. 5 discloses an example wherein apparatus 500 estimates an angle-of-arrival (AoA) of a communication signal received from apparatus 502. In the course of the estimation, various amplitude and phase samples for the received signal may be measured at each antenna in an antenna array residing in apparatus 500. The amplitude and phase measurements may be recorded by cycling an RF switch through each antenna in the antenna array. Apparatus 500 may then estimate an AoA for the signal using the recorded samples and parameters related to the antenna array. Antenna array parameters pertaining to the antenna array type and antenna pattern may be set in the device, for example, as part of the apparatus manufacturing process. As further set forth in FIG. 5, apparatus 500 must be able to identify that a signal is usable for performing AoA estimation prior to initiating the process. The usability of a signal may depend on apparatus 500 knowing what signal content to measure, including at least the length of the signal content to measure and possibility even a bit pattern contained in the signal content.

FIG. 6 shows an example of apparatus 600 performing angle-of-departure (AoD) estimation for a signal transmitted from apparatus 602. In such a configuration, apparatus 602 may transmit AoD enhanced packets and may execute antenna switching during the transmission of the packet. Apparatus 600 may scan for AoD enhanced packets and may execute amplitude and phase sampling during reception of these packets. Apparatus 600 may then utilize the amplitude and phase samples, along with antenna array parameter information, to estimate the AoD of the packet from apparatus 602. In accordance with at least one embodiment of the present invention, some of the fixed parameters related to the physical configuration of the antenna array in apparatus 602 may be obtained from a remote resource, such via a wired or wireless link to the Internet. Again, while the positioning methodology disclosed in FIG. 6 allows for positioning estimation in an apparatus that may not contain specialized positioning hardware, apparatus 600 must still be aware that the packets in the signal being transmitted by apparatus 206 are AoD enhanced packets prior to initiating AoD estimation processes.

Regardless of the manner by which positioning information is transmitted, for positioning purposes the signal source (e.g., AP) locations must also be known. AP location information may be requested from a database, which can be, for example, crowd-sourced (e.g., based on information contributed to the database by user apparatuses that perform sensing in the operational environment). Another possibility is that the AP locations are stored in the AP and transmitted as part of the signaling to the apparatus during positioning.

A problem in using direction-finding measurements recorded at WLAN APs for positioning apparatuses like mobile devices is reporting the direction-finding results back to the mobile phone for use in positioning. Note that this problem really only occurs in mobile-centric localization, or when a mobile device wants to localize itself (e.g., determine its own location). On the other hand, if the network wishes to locate a mobile device it may simply request AoA information from each AP for signals received from the mobile device, and then triangulate the location of the mobile device. However, in accordance with at least one embodiment of the present invention, mobile-centric localization can be made independent of the network provider by building the support functionality into the APs enabling mobile devices to locate themselves.

IV. Example Positioning within a Network

Figure 7:
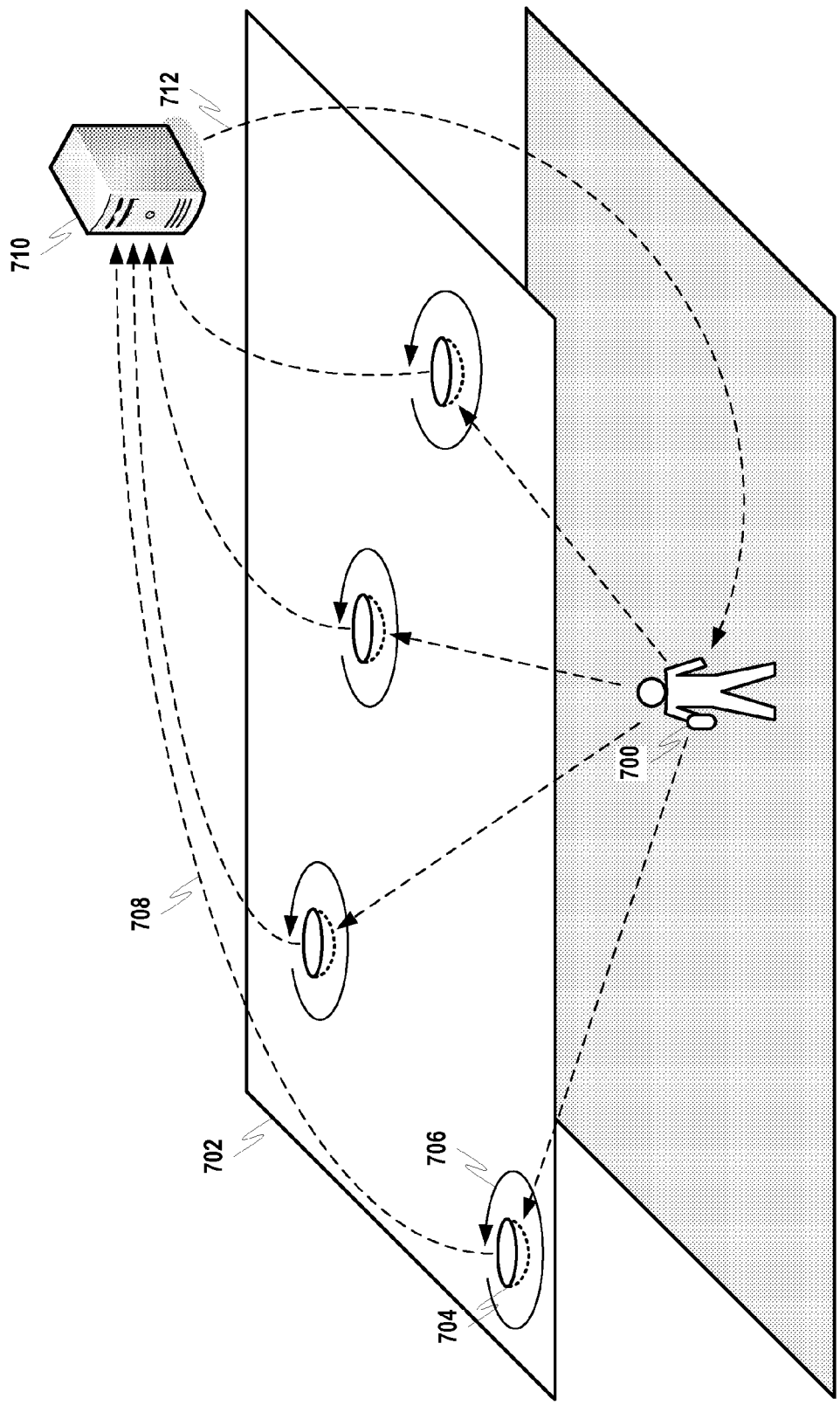
FIG. 7 discloses an example of a positioning system based on short-range wireless communication in accordance with at least one embodiment of the present invention.

Network-based positioning may be based on AoA and/or AoD information that is collected in a server that has connectivity to all APs. An example system is disclosed in FIG. 7. User 700 (e.g., possessing an apparatus enabled to communicate wirelessly) resides in operational environment 702 (e.g., inside a building). APs 704 may also reside in operation environment 702 (e.g., on the ceiling of the building) and may configured with an antenna array that may be cycled as shown at 706 when performing angle of AoA or AoD estimation. Each of the APs 704 may be coupled via wired or wireless communication 708 to server 710 in order to, for example, provide directional information to a centralized database in server 710. Further connectivity 712 between server 710 and user/apparatus 700 may enable localization for user/apparatus 710.

User/apparatus 700 may then access directional information from server 710 (e.g., in situations when authorized and having the necessary information to do so). For example, in Long Term Evolution (LTE) wireless implementations an Evolved-Serving Mobile Location Center (E-SMLC) may instruct base stations (e.g., eNodeBs) to measure the AoA of signals received from apparatuses interacting on the LTE network. These measurements may then be collected at the E-SMLC, which may make position determinations for each apparatus. It is important to note that in LTE the actual signal measurements are not routed to the terminal, only the final position determination for the apparatus, which may place high storage and connectivity capacity requirements upon the E-SMLC server. The potential for large burden centralized on the location server (e.g., caused by concurrently supporting many users/apparatuses) makes this type of localization system impractical for global implementation. Further, signals from various access points may be utilized for different position finding algorithms. For example, location triangulation based on connection to more than one AP, or AoA/AoD estimation for determining the relative direction to/from a receiver from/to the emitter of a signal, etc., may be employed.

V. Example Positioning without a Centralized Server Requirement

Figure 8A:
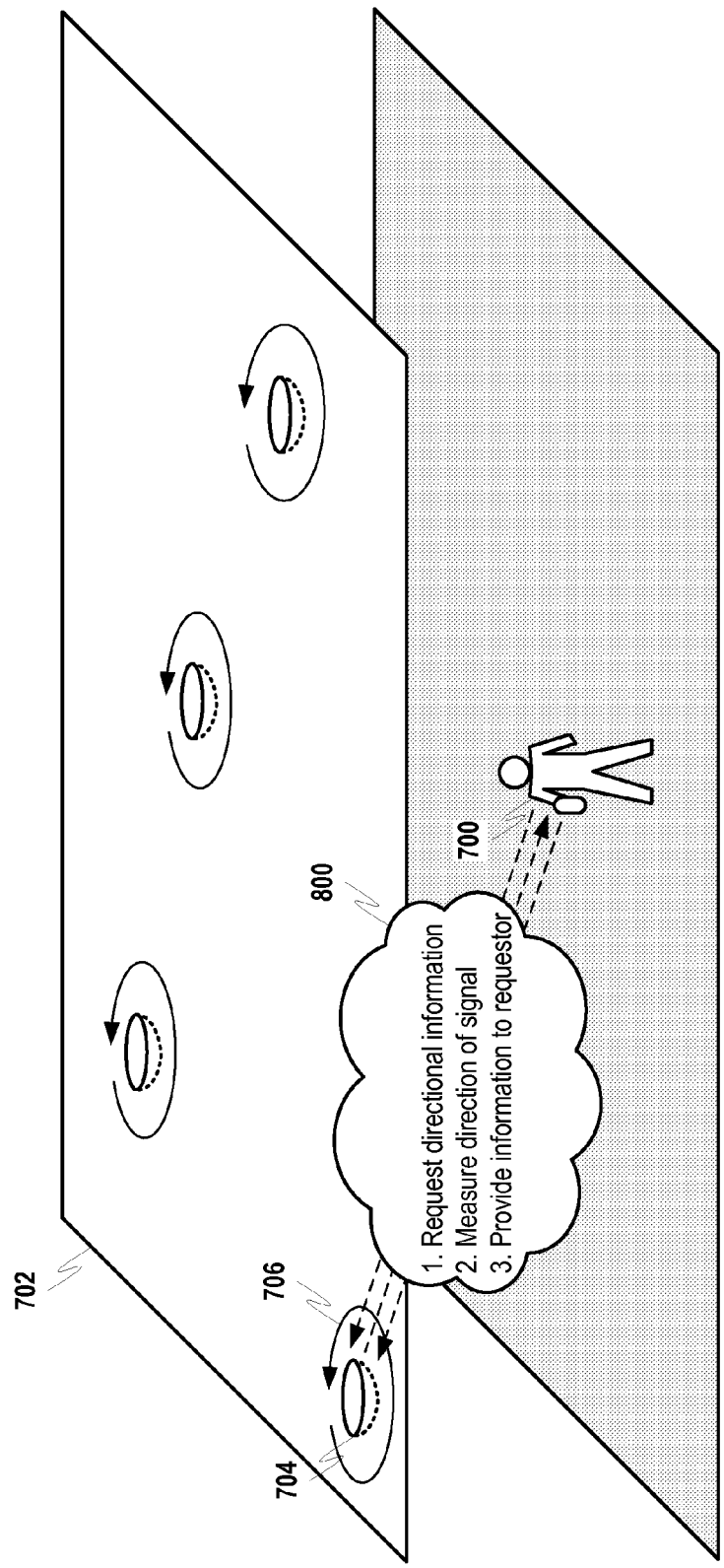
FIG. 8A discloses an example modified positioning system in accordance with at least one embodiment of the present invention.
Figure 8B:
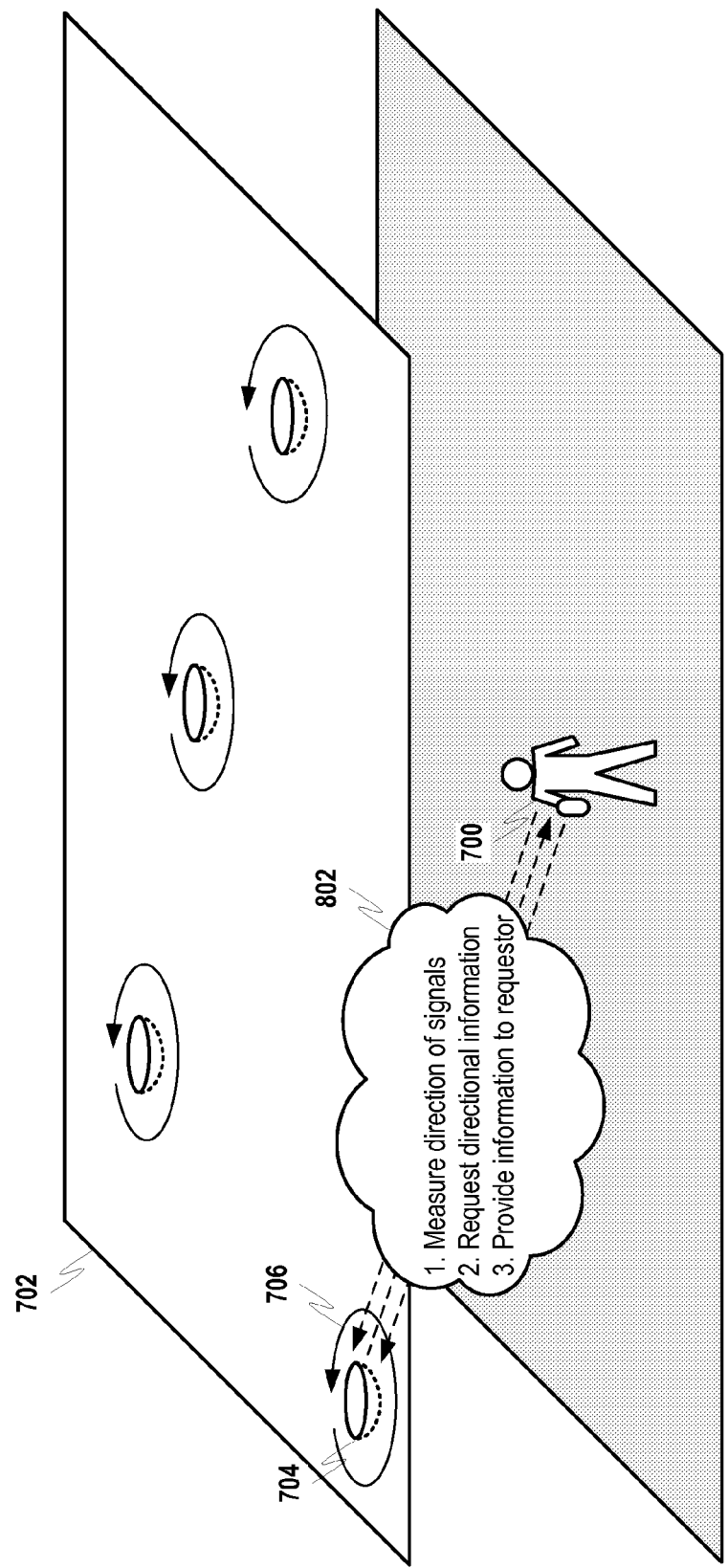
FIG. 8B discloses a second example modified positioning system in accordance with at least one embodiment of the present invention.
Figure 8C:
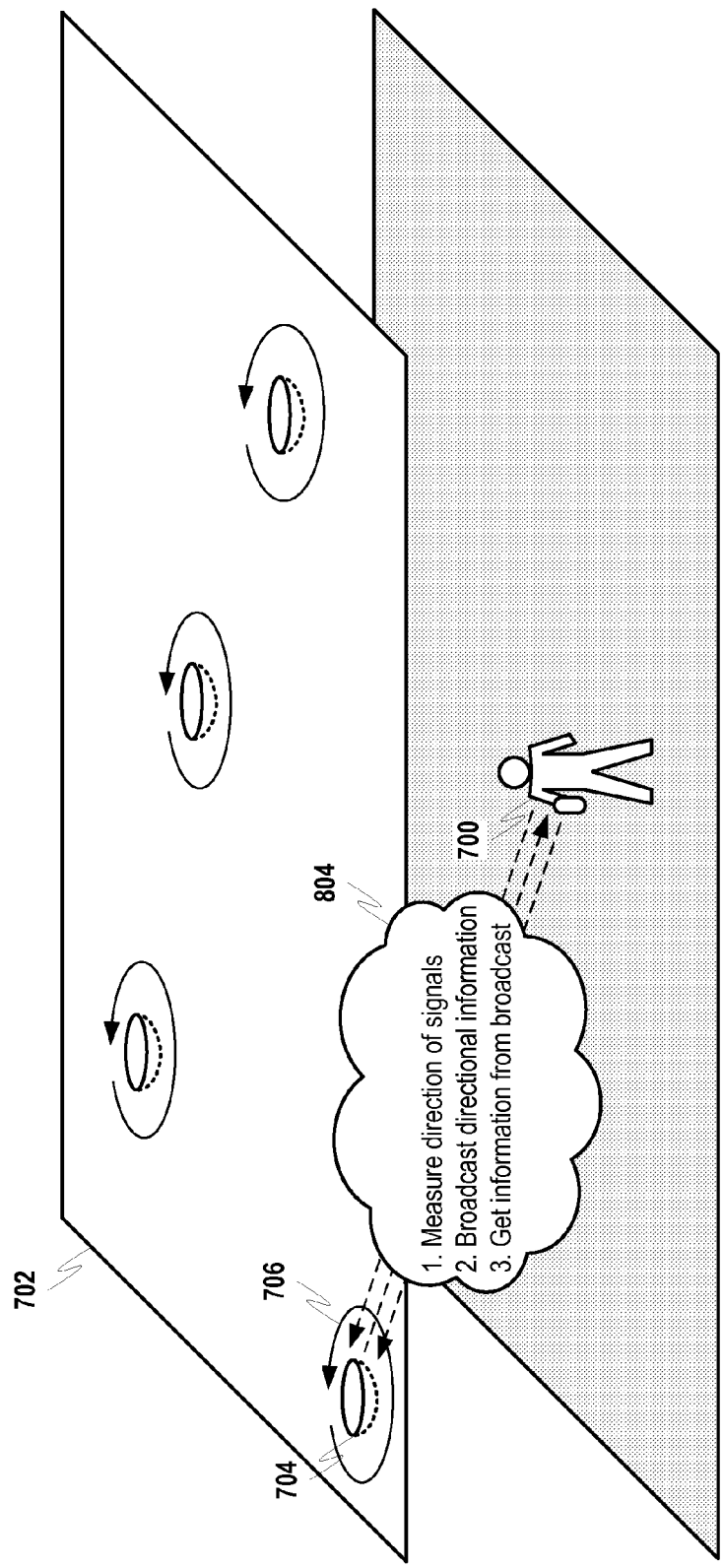
FIG. 8C discloses a third example modified positioning system in accordance with at least one embodiment of the present invention.

In accordance with at least one embodiment of the present invention, apparatuses (e.g., mobile wireless communication devices) may perform localization through interaction with another apparatus (e.g., wireless AP) without the necessity of going through a centralized server. FIG. 8A-8C disclose some example interaction scenarios through which user/apparatus 700 may determine position by direct interaction with an AP. Initially, each AP 704 may possess at least the hardware (e.g., an antenna array including a plurality of antennas) and software that would be required for computing directional information based on transmitted or received communication signals (e.g., for performing AoA or AoD estimation). Some or all of these resources may exist in each AP 704, or possibly some resources may be remotely located (e.g., directional estimation processing resources may be shared by multiple APs). Regardless, of how the resources may be allocated, wireless interaction 800 conducted by user/apparatus 700 may be primarily to AP 704.

In example interaction 800 disclosed in FIG. 8A, user/apparatus 700 may initially request directional information from AP 704. For example, a user may trigger an application on a mobile apparatus that requires current apparatus position as an input. Applications that utilize this type of information may include, but are not limited to, mapping applications, area searching applications (e.g., for locating objects, services, businesses proximate to the current location of the apparatus), routing applications, etc. Regardless of the consuming application, the need for current apparatus position may trigger user/apparatus 700 to establish a connection to a wireless communication network (e.g., WLAN) formed by APs 704 (e.g., if the apparatus is not already a member of the network) and to then request directional information from at least one AP 704.

Per interaction 800, upon receiving the request for directional information AP 704 may formulate the requested directional information. It may do this based on the request signal or by requesting a further signal from the requesting apparatus. If done based on the signal that contained the message requesting directional information, AP 704 may realize that the message being received is a request for directional information during the course of receiving the signal (e.g., based on flags set in the header of the message packet), and may perform AoA or AoD estimation based on the request message. Other communication signals may also be utilized for directional estimation, such as signals that are routinely exchanged between user/apparatus 700 and AP 704 during network interaction (e.g., beacon signals, synchronization signals, etc.) For example, as a part of the active AP scan (e.g., user/apparatus 700 may send a ping packet, spend some time on each WLAN channel and then receive responses to the ping packet) AP 704 may be able to provide back directional information. For example, AP 704 may transmit a message to user/apparatus 700, the message comprising directional information usable by user/apparatus 700 for determining apparatus location. Directional information may define, for example, a relative direction to/from AP 704, an estimated distance (e.g., based on RSS), etc. User/apparatus 700 may use the directional information to determine a location relative to AP 704. Moreover, if operational environment characteristic information (e.g., map, schematic, database or other data placing AP 704 within the operational environment) is available, user/apparatus 700 may utilize this information to extrapolate the current apparatus location within operational environment 702. Operational environment characteristic information may, for example, already exist in user/apparatus 700 prior to commencing positioning, may be provided in the response message sent from AP 704, may be obtained from another source, etc. Utilizing this mechanism for querying AoA measurements may have minimal impact on the signaling, and thus, may be easy to implement/contribute to the standard if implemented using WLAN.

Another possible mode of operation, in accordance with at least one embodiment of the present invention, is disclosed in FIG. 8B. Interaction 802 may differ from interaction 800 in that AP 704 in FIG. 8B may, in addition to any data communication responsibilities, track the position of apparatuses within communication range prior to receiving requests for directional information. In an example scenario where APs 704 are fixed-position members of a WLAN network to which other mobile devices (e.g., user/apparatus 700) may also belong, APs 704 may formulate and store directional information for the mobile devices with which it communicates. For example, mobile apparatus tracking may involve the formulation directional information based on attributable messaging (e.g., messages that identify the apparatuses from which they were sent) that occur during normal network interaction, and may be updated periodically based on time, based on the receipt of certain message types, based on changes in mobile apparatus membership (e.g., when an apparatus joins the network), etc. Each AP 704 may, for example, comprise a database including apparatus identification and the latest directional information corresponding to the apparatus. It is also possible for APs 704 to share database information.

As shown in FIG. 8B, user/apparatus 700 may request directional information from AP 704. Since AP 704 has already been in the process of formulating and maintaining directional information for nearby mobile apparatuses (e.g., that are members of the WLAN network), it may be possible for AP 704 to very quickly transmit a message responding to the request of user/apparatus 700, the response message comprising the requested directional information. User/apparatus 700 may utilize the received directional information to determine its position relative to AP 704, and if operational environment characteristic information is available, user/apparatus 700 may determine its location in the operational environment.

A third mode of operation, in accordance with at least one embodiment of the present invention, is disclosed in FIG. 8C. Interaction 804 does not require any initiation on the behalf of user/apparatus 700. More specifically, similar to the example of FIG. 8B, APs 704 may continually determine directional information corresponding to various proximate mobile apparatuses (e.g., user/apparatus 700) that are members of the wireless (e.g., WLAN) network. The frequency at which the directional information is updated may depend on the configuration of APs 704. APs 704 may associate formulated directional information with a particular mobile apparatus based on identification information taken from the signals used in formulation. The identification information (e.g., identifying the apparatus that was the source of the signal used in formulating the directional information) and the associated directional information may then be broadcast from AP 704. For example, in the case of a WLAN network this information may be broadcast in the beacon signal used to keep networked apparatuses in synchronization with the network. Any mobile apparatus (e.g., user/apparatus 700) desiring positioning information may then extract the applicable directional information from the broadcast based on the associated identification information. User/apparatus 700 may then utilize the directional information in determining its current position relative to AP 704, or relative to the operational environment if operational environment characteristic information is available to user/apparatus 700.

Figure 9:
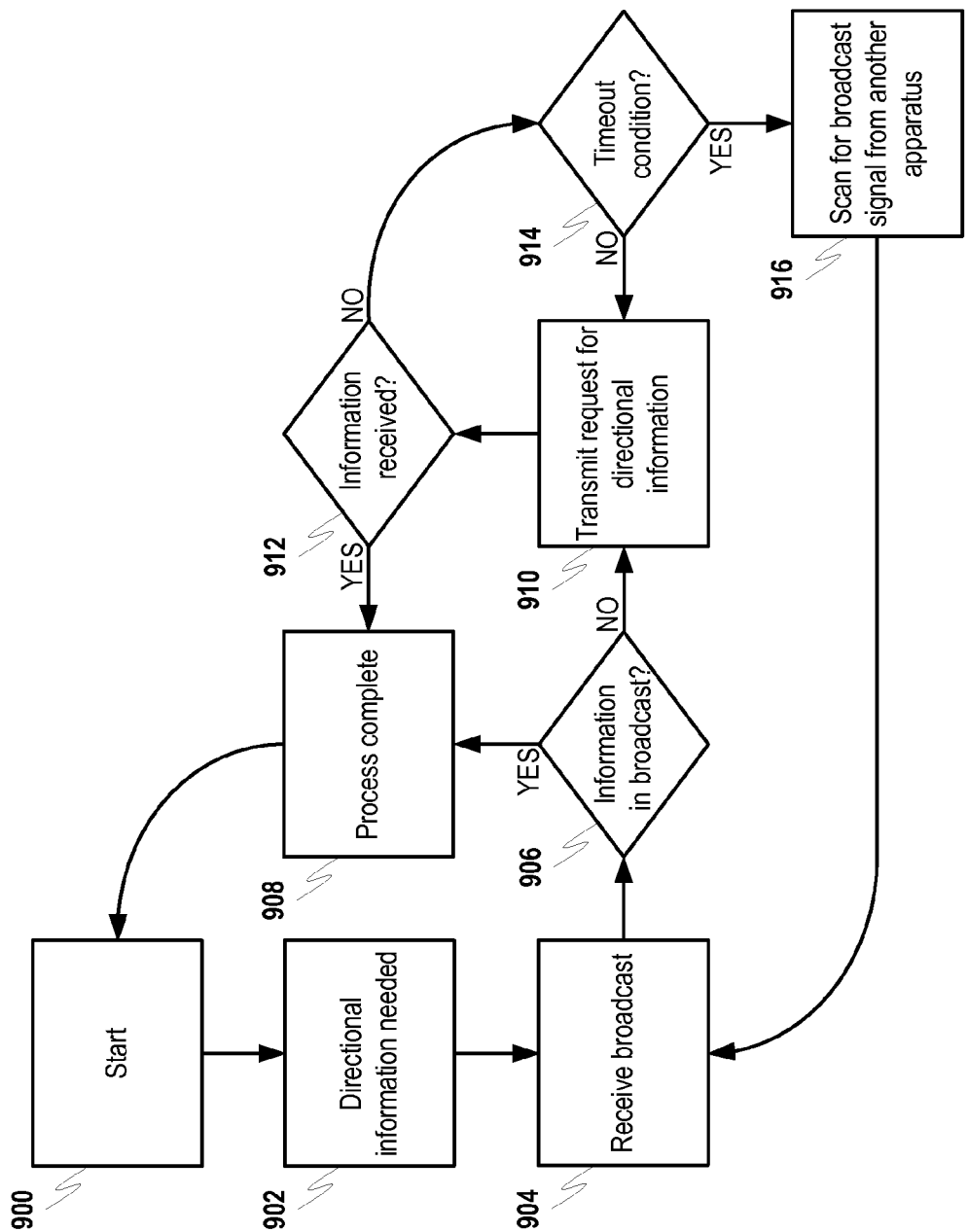
FIG. 9 discloses a flowchart for an example electronic positioning process from the perspective of an apparatus that requires positioning information in accordance with at least one embodiment of the present invention.

A flowchart for an example process, in accordance with at least one embodiment of the present invention, is disclosed in FIG. 9. The process may initiate in step 900, and in step 902 a determination may be made that directional information is required in an apparatus. For example, an application may be executed in the apparatus that requires current apparatus location information as an input. The process may then proceed to step 904 where a broadcast signal from at least one another apparatus (e.g., an AP) is received in the apparatus. The process may then proceed to step 906 a where a further determination may be made as to whether the received broadcast comprises the needed directional information. If the broadcast comprises directional information, then the process may be complete in step 908 and may reinitiate in step 900.

If a determination is made in step 906 that the broadcast signal does not comprise directional information, then the process may proceed to step 910 where a request for directional information may be transmitted to the apparatus from which the broadcast was received in step 904. A further determination may then be made in step 912 as to whether a response comprising at least directional information is received in the apparatus. If a response comprising at least directional information is received, then the process may again be complete in step 908 and may reinitiate in step 900. Otherwise, the process may proceed to step 914 wherein a further determination may be made as to whether a timeout condition has occurred. For example, the apparatus may try to determine its location for a certain amount of time, a certain number of attempts, etc., before taking alternative action. If it is determine that a timeout condition has not occurred, the process may return to step 910 to retransmit the request for directional information. If a determination is made in step 914 that a timeout has occurred, the apparatus may quit trying to obtain positional information from the other apparatus (e.g., AP) and in step 916 may scan for another apparatus that may provide the needed directional information. The process may then return to step 904 where a broadcast signal may be received from another apparatus.

Figure 10:
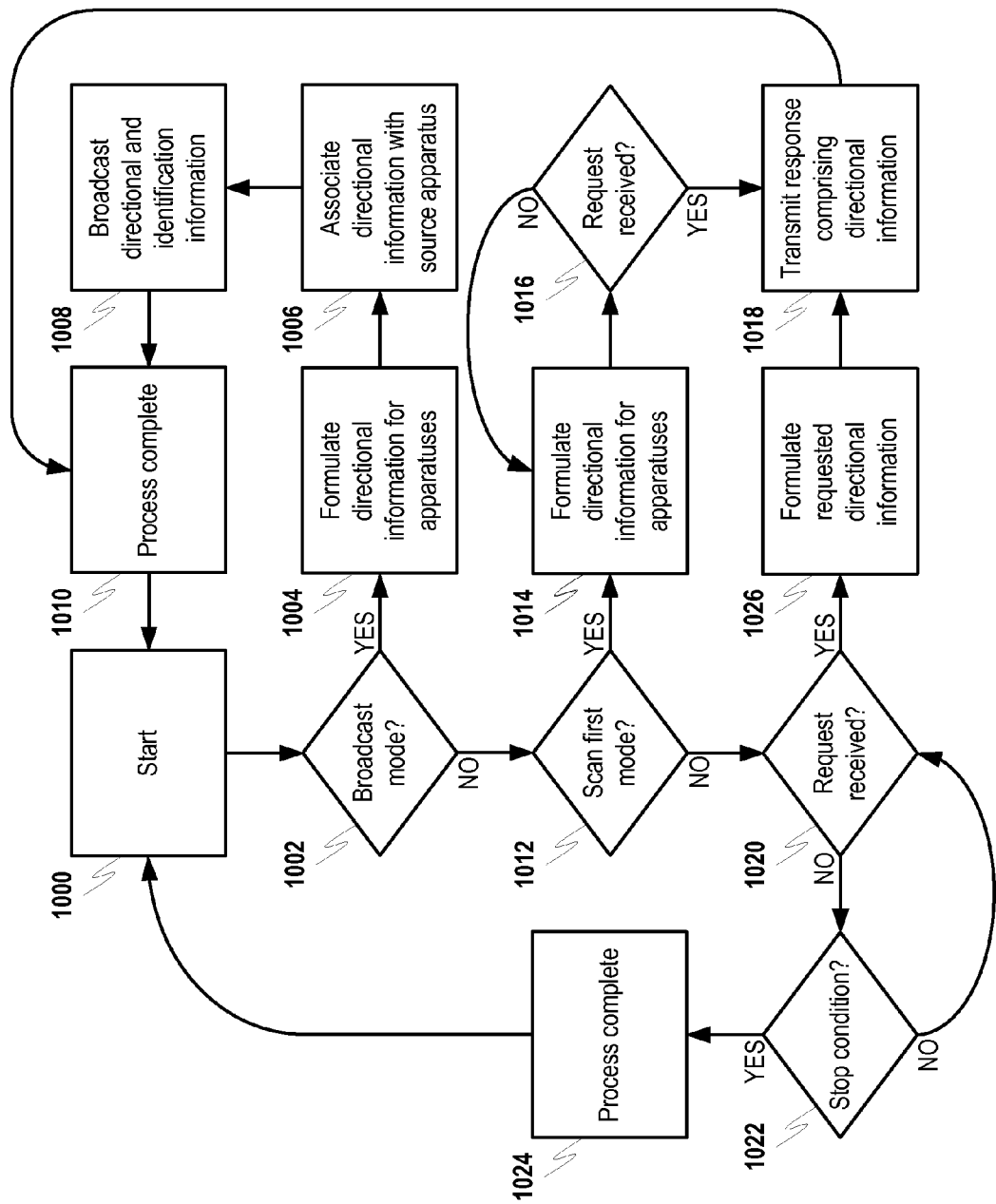
FIG. 10 discloses a flowchart for an example electronic positioning process from the perspective of an apparatus that provides positioning information in accordance with at least one embodiment of the present invention.

A flowchart for another example process from the viewpoint of an apparatus configured to provide directional information, in accordance with at least one embodiment of the present invention, is disclosed in FIG. 10. the process may initiate in step 1000 and may proceed to step 1002 where a determination may be made as to whether the apparatus is operating in a broadcast mode. If it is determined that the apparatus is currently operating in a broadcast mode, then in step 1004 directional information for other apparatuses in the area (e.g., that are members of the same wireless network as the apparatus) may be formulated in step 1004. Formulating directional information may involve receiving wireless signals from other apparatuses during the normal course of network interaction and formulating directional information based on these signals. The process may then proceed to step 1006 wherein identification information in the signals utilized to formulate directional information may be utilized to associate the directional information with the apparatuses from which the signals were sent (e.g., source apparatuses). The identification information and associated directional information may then be transmitted (e.g., broadcast) in step 1008 (e.g., in a beacon signal, synchronization signal or other network related signal). The process may then be complete in step 1010 and may reinitiate in step 1000.

If in step 1002 a determination is made that the apparatus is not operating in a broadcast mode, then a further determination may be made in step 1012 as to whether the apparatus is operating in a scan first mode. If the apparatus is determined to be operating in a scan first mode, the process may proceed to step 1014 wherein directional information may be formulated for signals received by the apparatus. Similar to step 1004, directional information may be measured for communication signals received in the apparatus, for example, as part of normal network interaction. In step 1016 a further determination may be made as to whether a request for directional information has been received in the apparatus. The apparatus may continue to formulate directional information in step 1014 until a request is received in step 1016. Upon receiving a request for directional information, the apparatus may provide the requested directional information to the requestor by transmitting a response message including the directional information in step 1018. For example, the apparatus may select the directional information to transmit to the requestor by matching the identity of the requesting apparatus with identification information from the signal utilized to formulate the directional information. The process may then be complete in step 1010 and may reinitiate in step 1000.

If in step 1012 it is determined that the apparatus is not operating in a scan first mode, then in step 1020 the apparatus may make a further determination as to whether a request for directional information has been received. If it is determined that no request for directional information has been received, then in step 1022 a further determination may be made as to whether a stop condition has occurred. Stop conditions may include, for example, a duration of time during which the apparatus should await directional information requests, a number of directional information requests, apparatus operational conditions (e.g., power level, processing load), etc. If it is determined that the stop condition has occurred, the process may be complete in step 1024 and reinitiate in step 1000. Otherwise, the apparatus may continue to monitor for directional information requests in step 1020. If a directional information request is determined to have been received in step 1020, the process may proceed to step 1026 where the apparatus may formulate the requested directional information based on, for example, network interaction (e.g., exchanged messages) between the apparatus and the requesting apparatus. The process may then return to step 1018 where the requested directional information may be transmitted to the requestor. The process may then be complete in step 1010 and may reinitiate in step 1000.

While various exemplary configurations of the present invention have been disclosed above, the present invention is not strictly limited to the previous embodiments.

At least one example embodiment of the present invention may include an apparatus comprising means for receiving a message via wireless communication, means for determining if the message comprises directional information, means for, if it is determined that the message comprises directional information, determining the location of the apparatus based on the directional information, and means for, if it is determined that the message does not comprise directional information, transmitting a message to the source of the message requesting directional information.

At least one example embodiment of the present invention may include an apparatus comprising means for determining whether the apparatus is operating in a broadcast mode or a scan first mode, means for, if it is determined that the apparatus is operating in a broadcast mode, formulating directional information for other apparatuses based on wireless signals received from the other apparatuses, associating the directional information for each of the other apparatuses with corresponding apparatus identification information and transmitting a message comprising the directional and identification information, and means for, if it is determined that the apparatus is operating in a scan first mode, formulating directional information for the other apparatuses based on wireless signals received from the other apparatuses and, if a message requesting directional information is received from at least one of the other apparatuses, transmitting a message comprising the directional information corresponding to the at least one of the other apparatuses.

At least one other example embodiment of the present invention may include electronic signals that cause apparatuses to receive a message via wireless communication, determine if the message comprises directional information, if it is determined that the message comprises directional information, determine the location of the apparatus based on the directional information, and if it is determined that the message does not comprise directional information, transmit a message to the source of the message requesting directional information.

At least one other example embodiment of the present invention may include electronic signals that cause an apparatus to determine whether the apparatus is operating in a broadcast mode or a scan first mode, if it is determined that the apparatus is operating in a broadcast mode, formulate directional information for other apparatuses based on wireless signals received from the other apparatuses, associate the directional information for each of the other apparatuses with corresponding apparatus identification information and transmit a message comprising the directional and identification information, and if it is determined that the apparatus is operating in a scan first mode, formulate directional information for the other apparatuses based on wireless signals received from the other apparatuses and, if a message requesting directional information is received from at least one of the other apparatuses, transmit a message comprising the directional information corresponding to the at least one of the other apparatuses.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   receiving a message in an apparatus via wireless communication;
   determining if the message comprises directional information;
   if it is determined that the message comprises directional information, determining the location of the apparatus based on the directional information;
   if it is determined that the message does not comprise directional information, transmitting a message to the source of the message requesting directional information;
   receiving a second message responding to the request message;
   determining that the second message does not comprise directional information; and
   scanning for another apparatus that may provide directional information.

2. The method of claim 1, wherein the message is received via a wireless local area network (WLAN) beacon signal and the source of the message is a WLAN Access Point (AP).

3. The method of claim 1, wherein the directional information comprises at least one of Angle of Arrival (AoA) information or Angle of Departure (AoD) information.

4. The method of claim 1, further comprising receiving a second message in the apparatus, the second message responding to the request message and comprising at least directional information; and determining the location of the apparatus based on the directional information.

5. A method, comprising:

determining whether an apparatus is operating in a broadcast mode or a scan first mode;

if it is determined that the apparatus is operating in a broadcast mode, formulating directional information for other apparatuses based on wireless signals received in the apparatus from the other apparatuses, associating the directional information for each of the other apparatuses with corresponding apparatus identification information and transmitting a message comprising the directional and identification information; and if it is determined that the apparatus is operating in a scan first mode, formulating directional information for the other apparatuses based on wireless signals received in the apparatus from the other apparatuses and, if a message requesting directional information is received in the apparatus from at least one of the other apparatuses, transmitting a message comprising the directional information corresponding to the at least one of the other apparatuses.

6. The method of claim 5, wherein transmitting a message comprising the directional and identification information comprises broadcasting the directional and identification information in a wireless local area networking (WLAN) beacon message.

7. The method of claim 5, wherein the directional information comprises at least one of Angle of Arrival (AoA) information or Angle of Departure (AoD) information.

8. The method of claim 5, further comprising, if it is determined that the apparatus is not operating in a broadcast or scan first mode, receiving a message requesting directional information from at least one of the other apparatuses, formulating directional information corresponding to the at least one of the other apparatuses, and transmitting a message comprising the directional information corresponding to the at least one of the other apparatuses.

9. A computer program product comprising computer executable program code recorded on a non-transitory computer readable medium, the computer executable program code comprising:

code configured to cause an apparatus to receive a message via wireless communication;

code configured to cause the apparatus to determine if the message comprises directional information;

code configured to cause the apparatus to, if it is determined that the message comprises directional information, determine the location of the apparatus based on the directional information;

code configured to cause the apparatus to, if it is determined that the message does not comprise directional information, transmit a message to the source of the message requesting directional information;

code configured to cause the apparatus to receive a second message responding to the request message;

code configured to cause the apparatus to determine that the second message does not comprise directional information; and code configured to cause the apparatus to scan for another apparatus that may provide directional information.

10. The computer program product of claim 9, wherein the message is received via a wireless local area network (WLAN) beacon signal and the source of the message is a WLAN Access Point (AP).

11. The computer program product of claim 9, wherein the directional information comprises at least one of Angle of Arrival (AoA) information or Angle of Departure (AoD) information.

12. The computer program product of claim 9, further comprising code configured to cause the apparatus to receive a second message, the second message responding to the request message and comprising at least directional information; and code configured to cause the apparatus to determine the location of the apparatus based on the directional information.

13. A computer program product comprising computer executable program code recorded on a non-transitory computer readable medium, the computer executable program code comprising:

code configured to cause an apparatus to determine whether the apparatus is operating in a broadcast mode or a scan first mode;

code configured to cause the apparatus to, if it is determined that the apparatus is operating in a broadcast mode, formulate directional information for other apparatuses based on wireless signals received in the apparatus from the other apparatuses, associate the directional information for each of the other apparatuses with corresponding apparatus identification information and transmit a message comprising the directional and identification information; and code configured to cause the apparatus to, if it is determined that the apparatus is operating in a scan first mode, formulate directional information for the other apparatuses based on wireless signals received from the other apparatuses and, if a message requesting directional information is received from at least one of the other apparatuses, transmit a message comprising the directional information corresponding to the at least one of the other apparatuses.

14. The computer program product of claim 13, wherein the code configured to cause the apparatus to transmit a message comprising the directional and identification information comprises code configured to cause the apparatus to broadcast the directional and identification information in a wireless local area networking (WLAN) beacon message.

15. The computer program product of claim 13, wherein the directional information comprises at least one of Angle of Arrival (AoA) information or Angle of Departure (AoD) information.

16. The computer program product of claim 13, further comprising code configured to cause the apparatus to, if it is determined that the apparatus is not operating in a broadcast or scan first mode, receive a message requesting directional information from at least one of the other apparatuses, formulate directional information corresponding to the at least one of the other apparatuses, and transmit a message comprising the directional information corresponding to the at least one of the other apparatuses.

17. An apparatus, comprising:
at least one processor; and at least one memory including executable instructions, the at least one memory and the executable instructions being configured to, in cooperation with the at least one processor, cause the apparatus to perform at least the following:

receive a message via wireless communication;

determine if the message comprises directional information;

if it is determined that the message comprises directional information, determine the location of the apparatus based on the directional information;

if it is determined that the message does not comprise directional information, transmit a message to the source of the message requesting directional information;

receive a second message responding to the request message;

determine that the second message does not comprise directional information; and scan for another apparatus that may provide directional information.

18. The apparatus of claim 17, wherein the message is received via a wireless local area network (WLAN) beacon signal and the source of the message is a WLAN Access Point (AP).

19. The apparatus of claim 17, wherein the directional information comprises at least one of Angle of Arrival (AoA) information or Angle of Departure (AoD) information.

20. The apparatus of claim 17, further comprising the at least one memory and the executable instructions being configured to, in cooperation with the at least one processor, cause the apparatus to receive a second message in the apparatus, the second message responding to the request message and comprising at least directional information; and determine the location of the apparatus based on the directional information.

21. An apparatus, comprising:

at least one processor; and at least one memory including executable instructions, the at least one memory and the executable instructions being configured to, in cooperation with the at least one processor, cause the apparatus to perform at least the following:

determine whether the apparatus is operating in a broadcast mode or a scan first mode;

if it is determined that the apparatus is operating in a broadcast mode, formulate directional information for other apparatuses based on wireless signals received in the apparatus from the other apparatuses, associate the directional information for each of the other apparatuses with corresponding apparatus identification information and transmit a message comprising the directional and identification information; and if it is determined that the apparatus is operating in a scan first mode, formulate directional information for the other apparatuses based on wireless signals received from the other apparatuses and, if a message requesting directional information is received from at least one of the other apparatuses, transmit a message comprising the directional information corresponding to the at least one of the other apparatuses.

22. The apparatus of claim 21, wherein the at least one memory and the executable instructions being configured to, in cooperation with the at least one processor, cause the apparatus to transmit a message comprising the directional and identification information comprises the at least one memory and the executable instructions being configured to, in cooperation with the at least one processor, cause the apparatus to broadcast the directional and identification information in a wireless local area networking (WLAN) beacon message.

23. The apparatus of claim 21, wherein the directional information comprises at least one of Angle of Arrival (AoA) information or Angle of Departure (AoD) information.

24. The apparatus of claim 21, further comprising the at least one memory and the executable instructions being configured to, in cooperation with the at least one processor, cause the apparatus to, if it is determined that the apparatus is not operating in a broadcast or scan first mode, receive a message requesting directional information from at least one of the other apparatuses, formulate directional information corresponding to the at least one of the other apparatuses, and transmit a message comprising the directional information corresponding to the at least one of the other apparatuses.

25. A system, comprising:

an apparatus; and an access point;

the apparatus receiving a message via wireless communication from the access point and determining if the message comprises directional information;

if it is determined that the message comprises directional information, the apparatus further determining the location of the apparatus based on the directional information, and if it is determined that the message does not comprise directional information, the apparatus further transmitting a message to the access point requesting directional information;

the apparatus receiving a second message responding to the request message;

the apparatus determining that the second message does not comprise directional information; and the apparatus scanning for another apparatus that may provide directional information.

* * * * *